INVENTOR
WARREN LEROY LEYDE

INVENTOR
WARREN LEROY LEYDE
BY
ATTORNEYS

2,917,738

AUTOMATIC FREQUENCY CONTROL SYSTEM FOR SEQUENTIAL-LOBING RADAR UNITS

Warren L. Leyde, Seattle, Wash., assignor, by mesne assignments, to the United States of America as represented by the Secretary of the Navy Application December 9, 1955, Serial No. 552,240

2 Claims. (Cl. 343—17.1)

The present invention relates to an automatic frequency control system for sequential-lobing radar units in which electrical energy storage devices are employed to provide the required local oscillator voltage for each lobe in advance of the transmitted pulse.

In most radar systems operating in the microwave region, an automatic frequency control consisting of a simple closed-loop servo system is employed to maintain the local oscillator tuned to the frequency which gives the proper beat note frequency into the intermediate frequency strip. The local oscillator is caused to sweep a frequency spectrum by the automatic frequency control until it crosses the desired frequency at which time a discriminator sends a signal to the storage unit which then stops the frequency sweep and stores the proper voltage from pulse to pulse in order to hold the local oscillator at the proper frequency. This automatic frequency control can follow relatively slow changes in magnetron frequency but cannot anticipate shifts in magnetron frequency that occur from pulse to pulse. Its successful operation depends upon the transmitted pulse being very nearly the same frequency for each consecutive pulse, a condition that is met by most search or conical scan type radar units but not by sequential-lobing radar units.

Sequential-lobing radar units lobe successively in each of several directions and then repeat the cycle; a typical sequence being: up, right, down, left, up, etc. In such systems the load impedances for the lobes are quite frequently not the same which, for example, may be the result of the presence of near-by objects that are not common to all directions. The load impedance must be considered, for frequency determining purposes, as a part of the magnetron tank circuit, and since the magnetron frequency is a function of the resonant frequency of the tank circuit, the frequency of the magnetron depends upon the load impedance. This dependency is termed "pulling." Due to "pulling," the requirement that the transmitted pulse be very nearly the same frequency for each consecutive pulse renders conventional automatic frequency control unsuitable for sequential-lobing radar units.

In the present invention, distinctive channels are provided to supply the correct local oscillator voltage from lobe to lobe and in addition to correct the voltages for any frequency shift that may occur during the lobing cycle. Initially, a sweeping device causes the local oscillator when connected to each channel to sweep and lockup the channel on the correct control voltage, and also if any channel loses lockup thereafter, the sweeping device is triggered to produce another sweeping operation. Thus, advantage is taken of the fact that in sequential lobing operations, the amount of "pulling," which may be appreciable, is repeated cycle after cycle and, hence, can be predicted for any particular lobe after the first cycle. In effect, each channel "remembers" the required local oscillator voltage for each lobe and applies this voltage to the local oscillator in advance of the transmitted pulse. Therefore, the signal going to the intermediate frequency strip is maintained at the correct frequency regardless of pulse-to-pulse "pulling" of the magnetron, and if there are any "non-pulling" frequency deviations during the lobing cycle the conventional automatic frequency control operation corrects the channel voltages.

Accordingly, an object of the present invention is the provision of an automatic frequency control that will maintain the correct intermediate frequency for a sequential-lobing radar unit.

Another object is to provide an automatic frequency control for a sequential lobing radar unit that will "remember" the required local oscillator voltage for each lobe and apply this voltage to the local oscillator in advance of the transmitted pulse.

A further object of the invention is the provision of an automatic frequency control for a sequential lobing radar unit that will retain the required local oscillator voltage for each lobe, apply this voltage to the local oscillator in advance of the transmitted pulse and will correct the voltage for frequency deviations that occur during the lobing cycle.

Other objects and many of the attendant advantages of this invention will be readily appreciated as the same becomes better understood by reference to the following detailed description when considered in connection with the accompanying drawings wherein.

Figure 1:
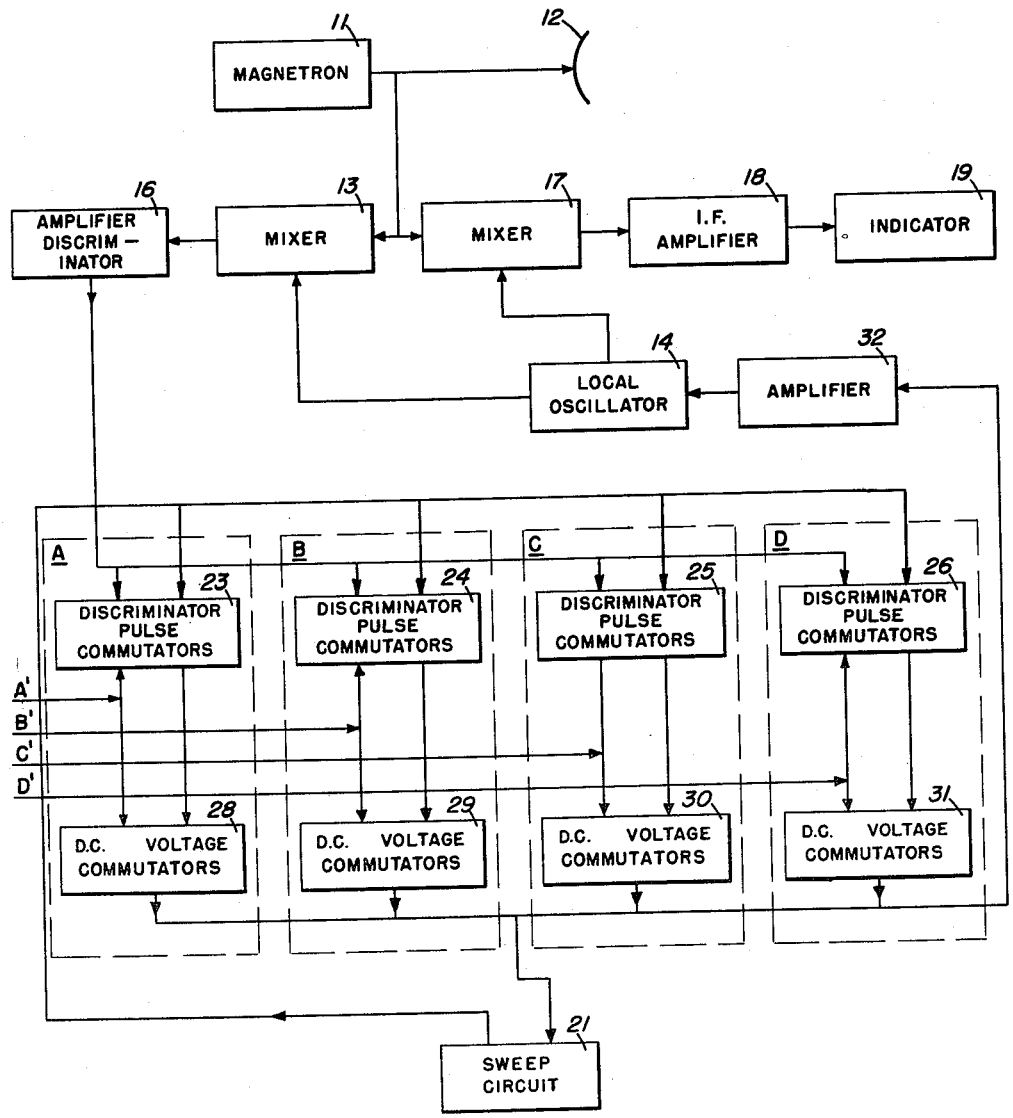
Fig. 1 illustrates a block diagram of a preferred embodiment of this invention employed with a conventional radar unit.

Referring now to the drawings, wherein like reference characters designate like or corresponding parts throughout the several views, there is shown in Fig. 1 (which illustrates a preferred embodiment) a conventional radar unit comprising magnetron 11 connected to transmit a signal to antenna 12 and mixer 13. Local oscillator 14 has an output which beats with the magnetron signal in mixer 13, and the resulting signal, which should be at the intermediate frequency, is fed to amplifier-discriminator 16 and is converted, therein, to a correcting signal for controlling the frequency of local oscillator 14 to maintain the beat signal at the intermediate frequency regardless of the frequency of magnetron 11. Mixer 17 is connected to antenna 12 to receive the echo pulses and to mix these pulses with an output from local oscillator 14. The mixed signal is fed to intermediate frequency amplifier 18 and indicator 19 where a visible presentation of the received signal is obtained. The present automatic frequency control resides in the circuits comprising channels A, B, C and D, one corresponding to each lobe, and sweep circuit 21, which are fed by the output from discriminator 16 and produce an output voltage for controlling the frequency of the local oscillator. Four sequential gates A', B', C' and D', i.e. one for each channel, are supplied to the automatic frequency control from circuits not shown, but which are included in conventional radar systems. Gates A', B', C', and D' correspond in time sequence with the portions of the lobing cycle. Each of the discriminator pulse commutators 23, 24, 25, and 26, is caused to send a direct voltage to the corresponding direct voltage commutator 28, 29, 30, and 31 which decays in about one second unless a pulse appears from the discriminator. In this event, the discriminator pulse commutator which has a gate applied to it accepts the discriminator pulse which causes the direct voltage to remain constant. The direct voltage commutator which has a gate at that time applies its voltage to the amplifier 32 and this controls the local oscillator frequency to produce the correct frequency for that lobe. It is seen that this voltage is applied to the local oscillator voltage in advance of the transmitted pulse and during the lobe period, beginning at the time of the transmitted pulse, the voltage for that channel is corrected by the customary action of discriminator 16 to compensate for slow frequency drifts.

Figure 2:
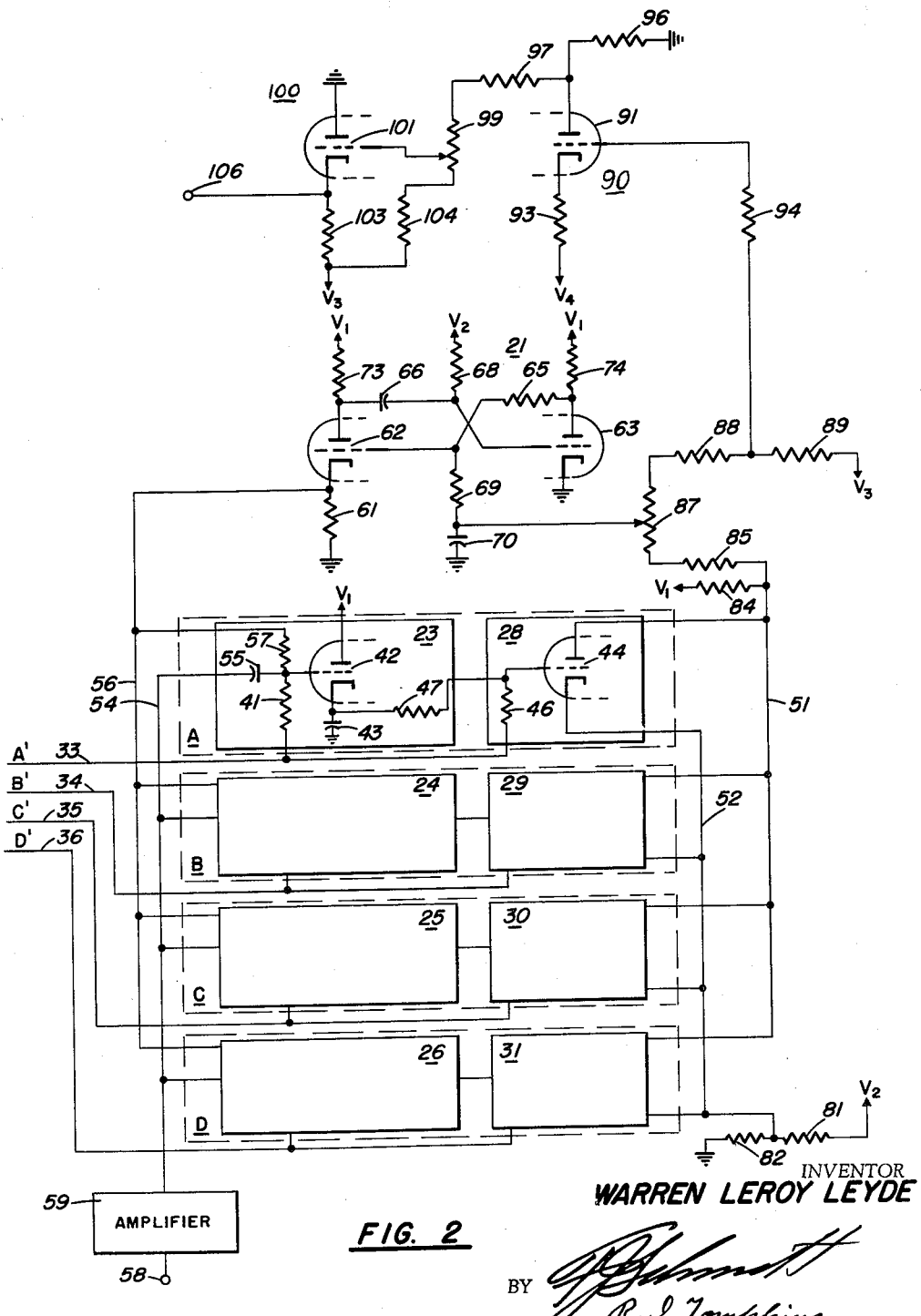
Fig. 2 shows a preferred circuit diagram of the invention illustrated in Fig. 1.

The details of the sweep and channel circuits are shown in Fig. 2, wherein the gate signals are applied, respectively, to leads 33, 34, 35, and 36, which are, in the absence of a gate, held at a negative potential by conventional radar circuits that are not shown. Since the channels are identical, only one, channel A, is shown in detail. Resistor 41 couples lead 33 to the grid of tube 42, which has a cathode connected through charging capacitor 43 to ground and a plate joined to a source of positive direct voltage $V_1$. The grid of tube 44 in the commutator section 28 is joined by resistor 46 to lead 33 and by resistor 47 to the cathode of tube 42. The plates of the tubes in all the direct voltage level commutator sections are connected to lead 51 and the cathodes to lead 52. All of the grids of the tubes in the pulse commutator sections are coupled to lead 54 by capacitors and to lead 56 by resistors identical respectively to capacitor 55 and resistor 57 of section 23. The input from the discriminator (not shown) is applied at terminal 58, amplified by amplifier 59, and then conducted to lead 54. A sweep circuit 21 illustrated here as a one-shot multivibrator, but which could be any one of a number of pulsing circuits, is connected to lead 56 at the junction of the cathode of tube 62 and grounded resistor 61. The plates and grids of tubes 62 and 63 are interconnected by resistor 65 and capacitor 66 in typical one-shot multivibrator fashion. A bias is provided for the grid of tube 63 from source $V_2$ via resistor 68 and for the grid of tube 62 through resistor 69 from a potentiometer arrangement which will be described later. Capacitor 70 serves to decouple the sweep from other circuits that are connected to the same bias supply. Resistors 73 and 74 serve as plate resistors for tubes 62 and 63, respectively. The voltage-dividing arrangement comprising resistors 81 and 82, and source $V_2$ are joined to lead 52 and thus place a positive potential on the cathodes of all the direct voltage level commutator tubes. Resistor 84, via lead 51, couples all of the plates of the commutator tubes to the positive voltage source $V_1$. The series combination of resistor 85, potentiometer 87, resistor 88, and resistor 89 is a voltage-dividing arrangement extending from lead 51 to negative direct voltage source $V_3$. The cathode of tube 91 of phase inverter 90 is joined to a negative direct voltage source $V_4$ through resistor 93 and the grid is coupled via resistor 94 to the junction between resistors 88 and 89. The inverted output appears across grounded plate resistor 96 and is conducted by resistor 97 to one end of potentiometer 99 which has its movable arm connected to the grid of tube 101 of cathode follower 100. Negative D.C. voltage source $V_3$ is coupled to the cathode of tube 101 by resistor 103 and to the other end of potentiometer 99 by resistor 104. Terminal 106 is provided for connecting the output of this automatic frequency control to the frequency control element of the local oscillator.

Initially, the pulse producing device of the sweeping circuit 21 cycles, producing a very short positive pulse on lead 56 which feeds the grids of the pulse commutator tubes causing the charging capacitors (capacitor 43 of channel A) to charge approximately to half the magnitude of the pulse. Considering channel A specifically, it is seen that lead 33 is at a negative potential three-quarters of the time (application of the gate raises the potential to ground). This means that capacitor 43 will discharge through resistors 47 and 46 in a very short time, in the order of one second. Except during the application of the gate, tube 44 is cut off and contributes nothing to the output. When the gate raises lead 33 to ground, the voltage at the grid of tube 44 is proportional to the voltage on capacitor 43, and tube 44 controls the voltage on lead 51, into which its plate feeds. The plate circuit conducts through the phase inverter 90, cathode follower 100, and thence to the local oscillator. The pulse producing device 21 is also joined, by means of potentiometer 87, to the plate circuit of tube 44 and if the plate voltage at any time becomes sufficiently positive, the device triggers and causes the system to start a new sweep cycle. Sufficiently positive voltage will occur whenever capacitor 43, or any of the other corresponding capacitors, discharges to some negative value. As capacitor 43 discharges negatively, the local oscillator changes frequency in the proper direction to make the discriminator send out a positive pulse when the intermediate frequency coincides with the cross-over point of the discriminator S curve. This pulse, after sufficient amplification, is applied by lead 54 to capacitor 55 to channel A and to the corresponding capacitors of the other channels. Since only one gate occurs at any one instant of time, and since the channels remain cut off without a gate, if channel A has a gate the direct voltage on capacitor 43 controls the local oscillator and at the same time the discriminator pulse is used to correct this voltage. This closes the servo loop and allows channel A to lockup on the magnetron frequency for one of the four lobes (independently of the other three lobes). The remaining three channels operate in a similar fashion providing control of the local oscillator on all four lobes, although the frequency may tend to shift several megacycles from one lobe to another. At the start of operation, or in the event that any channel loses lockup, it can be seen that if any or all of the capacitors 43, and corresponding capacitors, goes negative, the sweep multivibrator cycles, causing all four capacitors to recharge and make a new sweep.

The system just described can be used with any conventional local oscillator, mixer assembly, and discriminator, providing the input is presented at the proper voltage and impedance levels. Operation is not limited to four channels but restricted only by the fact that the magnetron "pulling" must periodically repeat a set pattern. Following are exemplary values for the circuit components that will give an operative system:

Resistors: Value (kilo-ohms)
| | |
|---|---|
| 46 | 3900 |
| 47 | 1500 |
| 68 | 1000 |
| 74, 89, 104 | 330 |
| 65, 69, 94, 103 | 270 |
| 41, 57, 85 | 220 |
| 97 | 68 |
| 81, 84 | 56 |
| 73 | 27 |
| 61, 96 | 22 |
| 88, 93 | 15 |
| 82 | 3.9 |

Potentiometers:
| | |
|---|---|
| 99 | 100 |
| 87 | 50 |

Capacitors: Micro-farads
| | |
|---|---|
| 55 | 150 |
| 43 | .5 |
| 70 | 470 |

Tubes: Type
| | |
|---|---|
| 42, 62, 63 | ½ 12AX7 |
| 44, 91, 101 | ½ 12AU7 |

Voltages: Volts
| | |
|---|---|
| $V_1$ | +300 |
| $V_2$ | +150 |
| $V_3$ | −500 |
| $V_4$ | −150 |

Obviously many modifications and variations of the present invention are possible in the light of the above teachings. It is therefore to be understood that within the scope of the appended claims the invention may be practiced otherwise than as specifically described.

What is claimed is:

1. In a sequential-lobing radar unit including a local oscillator, having a voltage responsive frequency determining element, mixer means coupled to said local oscillator, a discriminator circuit coupled to said mixer means, and an intermediate frequency section coupled to said mixer means; an automatic frequency control circuit comprising: means to generate a plurality of voltages having amplitudes which decay as a function of time, means to sequentially couple said plurality of voltages to said frequency determining element in synchronism with the lobing cycle to separately control the operating frequency of said oscillator during each lobe period, and means coupled to said discriminator and cooperating with said voltage generating means to periodically establish the amplitudes of said voltages at selected values whereby the operating frequency of said oscillator may be maintained in the vicinity of a value during each portion of the lobing cycle.

2. An automatic frequency control for a sequential-lobing radar system having a magnetron, a local oscillator of the type provided with a voltage responsive frequency determining element, a mixer coupled to said magnetron and to said local oscillator, and a discriminator coupled to said mixer, said control comprising: a plurality of channels for respectively and sequentially controlling the operating frequency of said local oscillator during each portion of the lobing cycle, each of said channels comprising a pulse commutator adapted to be coupled to said discriminator, a charge storage means coupled to said pulse commutator, a direct voltage level commutator, and means coupling the output voltage from said charge storage means to said direct voltage level commutator; means for generating and sequentially applying gating pulses conjointly to the pulse commutators and the direct voltage level commutators of said channels, whereby all said channels except the one having a gate will be cut off; pulse producing means which upon being activated produces very short positive pulses; circuit means coupling the output of said pulse producing means to the input of said pulse commutators; means coupled to said direct voltage level commutators and to said pulse producing means to activate said pulse producing means when the output voltage of any of said charge storage means decreases in amplitude below a selected value; and circuit means adapted to connect the output from said direct voltage level commutators to said frequency determining element.

References Cited in the file of this patent

UNITED STATES PATENTS

| | | |
|---|---|---|
| 2,422,334 | Bedford | June 17, 1947 |
| 2,461,144 | Cook | Feb. 8, 1949 |
| 2,469,875 | Fyler | May 10, 1949 |
| 2,479,586 | Moore | Aug. 23, 1949 |
| 2,536,051 | Frank | Jan. 2, 1951 |
| 2,725,555 | Hopper | Nov. 29, 1955 |